US006645636B2

(12) United States Patent
Van Benthem

(10) Patent No.: US 6,645,636 B2
(45) Date of Patent: Nov. 11, 2003

(54) CONDENSATION POLYMER CONTAINING ESTERALKYLAMIDE-ACID GROUPS

(75) Inventor: Rudolfus A. T. M. Van Benthem, Sittard (NL)

(73) Assignee: DSM N.V., Heerlen (NL)

(\*) Notice: Subject to any disclaimer, the term of this patent is extended or adjusted under 35 U.S.C. 154(b) by 25 days.

(21) Appl. No.: 09/961,182

(22) Filed: Sep. 24, 2001

(65) Prior Publication Data

US 2002/0035236 A1 Mar. 21, 2002

Related U.S. Application Data

(63) Continuation of application No. PCT/NL00/00179, filed on Mar. 17, 2000.

(30) Foreign Application Priority Data

Mar. 24, 1999 (EP) .............................................. 99200919

(51) Int. Cl.[7] .............................................. C08L 77/12

(52) U.S. Cl. .................. 428/423.1; 428/474.4; 525/419; 525/437; 528/288; 528/291; 528/335

(58) Field of Search .................. 528/335, 288, 528/291; 525/419, 437; 428/423.1, 474.4

(56) References Cited

U.S. PATENT DOCUMENTS 3,709,858 A 1/1973 Blood et al.

FOREIGN PATENT DOCUMENTS

EP WO 99/16810 \* 4/1999

\* cited by examiner

*Primary Examiner*—Ana Woodward
(74) *Attorney, Agent, or Firm*—Pillsbury Winthrop LLP

(57) ABSTRACT

A condensation polymer, obtained through reaction of an alkanolamide and a cyclic anhydride to form a hydroxyalkylamide, followed by polycondensation of the hydroxyalkylamide, has at least two carboxylic acid end groups connected to an alkylamide groups via an ester linkage. The polymers may be used in powder paint compositions.

16 Claims, No Drawings

CONDENSATION POLYMER CONTAINING ESTERALKYLAMIDE-ACID GROUPS

CROSS-REFERENCE TO RELATED APPLICATIONS

This Application is a continuation of International Application PCT/NL00/00179, filed Mar. 17, 2000, which designated the U.S. and was published in the English language.

The invention relates to a condensation polymer having at least one carboxylic acid endgroup connected to an alkylamide group via an ester linkage.

Preferably, the polymer contains at least two groups according to formula (I):

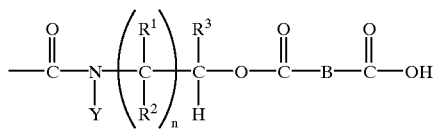
(I)

in which

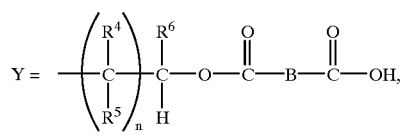

H, $(C_1–C_{20})$(cyclo)alkyl, or $(C_6–C_{10})$aryl,
- B=$(C_2–C_{24})$, optionally substituted, aryl or (cyclo)alkyl aliphatic diradical,
- $R^1$, $R^2$, $R^3$, $R^4$, $R^5$ and $R^6$ may, independently of one another, be the same or different, H, $(C_6–C_{10})$aryl or $(C_1–C_8)$(cyclo)alkyl radical and
- n=1–4.

More preferably the polymer contains at least two groups according to formula (II):

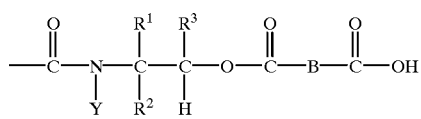
(II)

in which

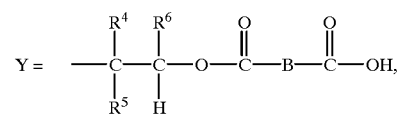

H, $(C_1–C_{20})$(cyclo)alkyl, or $(C_6–C_{10})$aryl,
- B=$(C_2–C_{24})$, optionally substituted, aryl or (cyclo)alkyl aliphatic diradical, and
- $R^1$, $R^2$, $R^3$, $R^4$, $R^5$ and $R^6$ may, independently of one another, be the same or different, H, $(C_6–C_{10})$aryl or $(C_1–C_8)$(cyclo)alkyl radical.

According to another preferred embodiment, the polymer containing hydroxyalkylamide groups is a polymer according to formula (III):

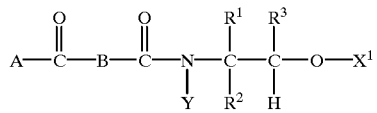
(III)

in which:

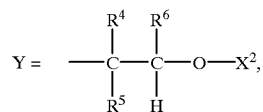

H, $(C_1–C_{20})$(cyclo)alkyl or $(C_6–C_{10})$aryl

A=OH,

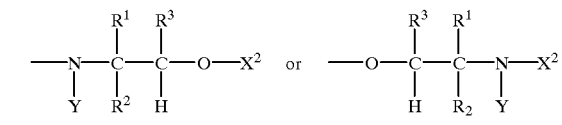

B=$(C_2–C_{24})$, optionally substituted, aryl or (cyclo)alkyl aliphatic diradical,

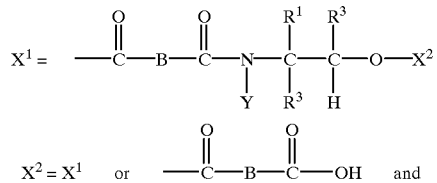

$R^1$, $R^2$, $R^3$, $R^4$, $R^5$ and $R^6$ may, independently of one another, be the same or different, H, $(C_6–C_{10})$aryl or $(C_1–C_8)$(cyclo)alkyl radical or $CH_2$—$OX^2$.

In formulas (I), (II) and (III) R groups may together or with neighbouring carbon atoms form part of a cycloalkyl group.

According to another preferred embodiment of the invention, the polymer containing β-esteralkylamide-acid groups is a polymer according to formula (IV):

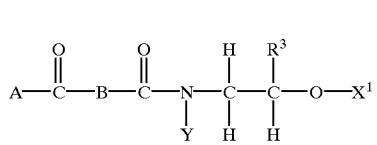
(IV)

in which:

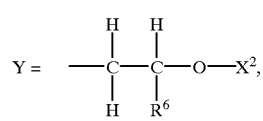

H, $(C_1–C_{20})$(cyclo)alkyl or ($C_6$–$C_{10}$)aryl,

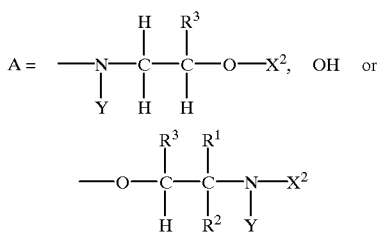

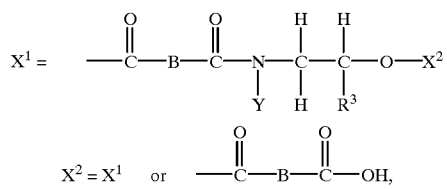

B=($C_2$–$C_{24}$), optionally substituted, aryl or (cyclo)alkyl aliphatic diradical,

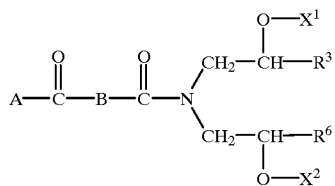

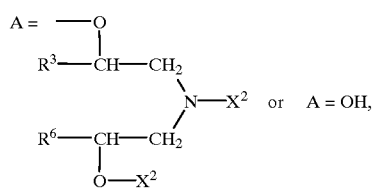

$R^3$=H or ($C_6$–$C_{10}$)aryl or ($C_1$–$C_8$)alkyl radical and
$R^6$=H or ($C_6$–$C_{10}$)aryl or ($C_1$–$C_8$)alkyl radical.

The weight average molecular mass of the polymer according to the invention generally ranges between 500 and 50,000, and is preferably between 600 g/mol and 10,000 g/mol.

The number average molecular mass may range between 400 and 10,000 and is preferably between 500 and 2000.

The esteralkylamide-acid functionality may range between 2 and 250 and is preferably between 3 and 50.

The functionality is the average number of reactive groups of the specific type per molecule in the polymer composition.

According to another preferred embodiment of the invention the polymer's carboxyl group functionality of the polymer is $\geq 3$ and the polymer containing esteramide acid groups is a polymer represented by formula (V):

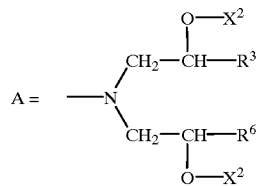

in which:

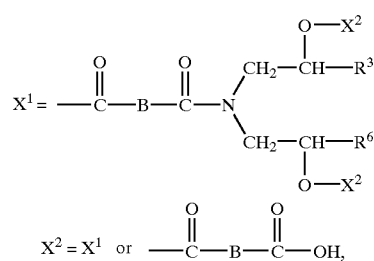

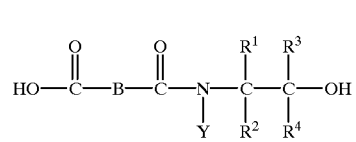

B=($C_2$–$C_{12}$), optionally substituted, aryl or (cyclo)alkyl aliphatic diradical, $R^3$=H or ($C_6$–$C_{10}$)aryl or ($C_1$–$C_8$)(cyclo)alkyl radical and
$R^6$=H or ($C_6$–$C_{10}$)aryl or ($C_1$–$C_8$)(cyclo)alkyl radical
Preferably $R^3$ and $R^6$ are ($C_1$–$C_4$)alkyl.

According to another preferred embodiment of the invention $R^3$ and $R^6$ are methyl or ethyl.

B may be saturated or unsaturated.

B may be substituted with, for example, a ($C_1$–$C_{26}$)alkyl group, which may be saturated or unsaturated; or with a carboxylic acid.

B may be for example a (methyl)-1,2-ethylene, octenyl- or dodecenyl-1,2-ethylene, (methyl-)1,2-ethylidene, 1,3-propylene, (methyl-)1,2-cyclohexyl, 4-carboxyl-1,2-phenylene, (methyl-)1,2-phenylene, 1,3-phenylene, 1,4-phenylene, 2,3-norbornyl, 2,3-norbornen-5-yl and/or (methyl-)1,2 cyclohex-4-enyl radical.

Depending on the starting monomers chosen, the variables B, $R^1$, $R^2$, $R^3$, $R^4$, $R^5$ and $R^6$ in the molecule or mixture of molecules can be selected to be the same or different per variable.

The polymer composition according to the invention may be a composition comprising higher and lower oligomers, which usually contains less than 50 wt. %, preferably less than 30 wt. %, of oligomers having a molecular weight smaller than 400.

The polymer according to the invention may, for example, be obtained through polycondensation of an hydroxyalkylamide-acid and an esteralkylamide diacid derived from an alkanolamine.

The hydroxyalkylamide-acid of an alkanolamine may have the formula (VI):

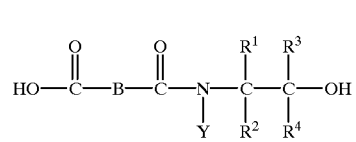

and the esteralkylamidediacid of an alkanolamine generally can be represented by formula (VII):

(VII)

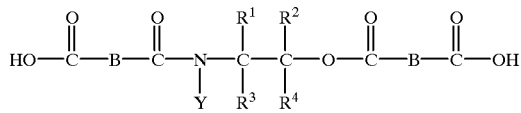

wherein
R$^1$, R$^2$, R$^3$ and R$^4$ may, independently of one another, be the same or different, H, (C$_6$–C$_{10}$)aryl or (C$_1$–C$_8$)(cyclo)alkyl radical and

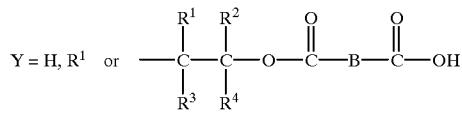

Consequently a lineair polymer according to the invention generally comprises the amide and the ester groups alternating along the chain as follows:
E-A-E-A-E-E-A-E-A-E
wherein one or more diesters are coupled with alternating ester (E)—amide (A) groups or
E-A-E-A-E-A-E-A-E
wherein ester and amide groups are perfectly alternating throughout the polymer.

A branched polymer according to the invention generally comprises the amide and the ester groups alternating along the main and side chains as follows:

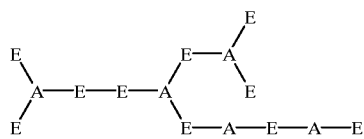

wherein one or more diestersare coupled with alternating ester (E)—amide (A) groups or

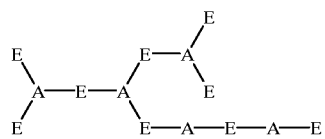

wherein ester and amide groups are perfectly alternating through the polymer.

Generally, the molar amount of amide bonds in the chain is lower than the amount of ester bonds.

The polymer according to the invention comprises at least 60% by weight of the products represented by the formulas (III)–(V).

According to a preferred embodiment of the invention the polymer is obtained in a one-step procedure by reacting an alkanolamine and a molar excess of cyclic anhydride, at a temperature between, for example, about 20° C. and about 100° C., to form a hydroxyalkylamide, after which, at a temperature between, for example, 120° C. and 250° C., a polyesteramide is obtained through polycondensation. Optionally water may be removed through distillation.

The removal of water through distillation may take place at a pressure higher than 1 bar, in a vacuum or azeotropically.

The reaction may take place without a solvent, but it is also possible that the reaction takes place in water or in an organic solvent.

Preferably, the cyclic anhydride is an anhydride according to formula (VIII):

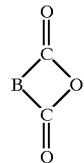

(VIII)

in which B has the meaning specified above.

Examples of suitable cyclic anhydrides include phthalic anhydride, tetrahydrophthalic anhydride, naphtalenic dicarboxylic anhydride, hexahydrophthalic anhydride, 5-norbornene-2,3-dicarboxylic anhydride, norbornene-2,3-dicarboxylic anhydride, naphtalenic dicarboxylic anhydride, 2-dodecene-1-yl-succinic anhydride, maleic anhydride, trimellitic anhydride, (methyl, octyl or dodecenyl)succinic anhydride, glutaric anhydride, 4-methylphthalic anhydride, 4-methylhexahydrophthalic anhydride, 4-methyltetrahydrophthalic anhydride and the maleinised alkylester of an unsaturated fatty acid.

Preferably the alkanol is an alkanolamine according to formula (IX):

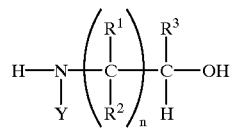

(IX)

in which:

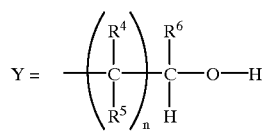

or (C$_1$–C$_{20}$)(cyclo)alkyl,
R$^1$, R$^2$, R$^3$, R$^4$, R$^5$ and R$^6$ may, independently of one another, be the same or different, H, (C$_6$–C$_{10}$)aryl or (C$_1$–C$_8$)(cyclo)alkyl radical or CH$_2$OH and n=1–4.

More preferably n=1.

The alkanolamine may be a monoalkanolamine, a dialkanolamine, a trialkanolamine or a mixture hereof.

If monoalkanolamines are used in one of the possible polymer syntheses, linear polymers with a functionality of 2 can be obtained. Depending on the application desired, a linear or an entirely or partly branched polymer can be selected, in which case the degree of branching can be set via the alkanolamines chosen.

If a highly branched structure with a high functionality is desired, di- or trialkanolamines can be used, also carboxylic acid substituted anhydrides in combination with monoalkanolamines can be used as a starting compound.

Examples of suitable mono-β-alkanolamines include ethanolamine, 1-(m)ethyl ethanolamine, n-butyl ethanolamine, 1-(m)ethyl isopropanolamine, isobutanolamine, β-cyclohexanolamine, n-butyl isopropanolamine and n-propanolamine.

Examples of suitable di-β-alkanolamines are 3-amino-1,2-propanediol, 2-amino-1,3-propanediol diisobutanolamine (bis-2-hydroxy-1-butyl)amine), di-β-cyclohexanolamine and diisopropanolamine (bis-2-hydroxy-1-propyl)amine).

A suitable trialkanolamine is, for example, tris (hydroxymethyl)aminomethane.

Preferably a β-alkyl-substituted β-hydroxyalkylamide is used. Suitable examples include (di)isopropanolamine, cyclohexyl isopropanolamine, 1-(m)ethyl isopropanolamine, (di)isobutanolamine, di-β-cyclohexanolamine and/or n-butyl isopropanolamine.

These polymer compositions show an improved resistance to hydrolysis.

Most preferable diisopropanolamine and/or diisobutanolamine are applied.

The anhydride:alkanolamine equivalent ratio is generally between 2.0:1.0 and 3.0:1.0. Preferably, this ratio is between 2,1:1.0 and 2,8:1.0.

The compound according to the invention may also be obtained via a reaction between an alkanolamine, as for example described above, and a molar excess of a compound containing one acid group and one activated acid group after which a polyesteramide is obtained through polycondensation. The ratio may be between for example 2.0;1.0 and 3.0:1.0.

The compound containing an acid group and an activated acid group is preferably a compound according to formula (X):

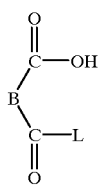
(X)

in which

B has the meaning specified above and

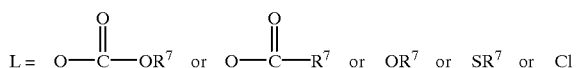

in which $R^7$ is a $(C_1-C_{12})$ branched or linear alkyl group.

Examples of suitable compounds containing one acid group and one activated acid group are alkyl esters, such as, for example, mono(m)ethyl adipate and mono(m)ethyl sebacate, anhydrides and thioesters.

The compound according to the invention may also be obtained via a reaction between a cyclic anhydride, as for example described above, and an alcohol, after which the obtained reaction product reacts in situ with an alkanolamine. A polyesteramide may be subsequently obtained through polycondensation.

Examples of suitable alcohols are $(C_1-C_{10})$ alcohols.

Preferably, methanol or ethanol is used.

In addition to carboxyl groups, the polymer may also contain hydroxyalkylamide groups, in amounts of between 0.01 and 2.0 mg equivalent/gram of polymer. The number of hydroxyalkylamide present in the polymer can be controlled via the anhydride/alkanolamine ratio and via the degree of conversion. If an anhydride excess is used and the polycondensationreaction is (almost) complete, less than 0.2 mg equivalent OH/gram of polymer is usually present. If hydroxyalkylamide groups are present, they may in a subsequent step react with compounds containing one or more groups that can react with β-hydroxyalkylamide, such as for example anhydrides, carboxylic chlorides, activated esters or carboxylic acid groups. The amount of hydroxyalkylamide is preferably as low as possible, for example between 0.01 and 0.2 mg equivalent/gram of polymer.

The degree of branching and the functionality of the polymer are dependent on the starting materials and the molecular weight of the polymer. A molecular weight higher than 3000 and the use of di- and/or trialkanolamines generally lead to highly branched structures with a functionality of ≧6.

Due to the presence in amounts of less than 10% by weight (of the total amount of anhydrides) of bis- and dianhydrides instead of the anhydrides according to formula (VIII) it is possible that the polymer does not comprise only products according to formulas (III)–(V).

The invention also relates to entirely or partly modified polymers.

The modification may, for example, take place via a reaction between the polymer according to any one of formulas (III), (IV) or (V) with a monomer, oligomer or polymer containing reactive groups that can react with the carboxylic acid groups. Depending on the reaction components a catalyst can be selected.

Examples of suitable reactive groups include alcohol groups, oxazoline groups, alkyl halide groups, epoxy groups, strained ring olephinic groups, epoxychlorohydrine groups, amine groups, 1,2-diene groups, for example butadiene, and combinations hereof.

Preferably the monomer, oligomer or polymer contains only one group that can react with hydroxylalkylamide, as a result of which no crosslinking takes place during the modification.

The polymer according to formula (III), (IV) or (V) has preferably been modified with a compound containing an epoxy group, oxazolidine group, strained ring olephinic group or alcohol group. Synthesis of the modified polymer can take place in a two-step process or in a one step process.

The two-step process comprises in a first step the preparation of the condensation polymer having carboxylic acid end groups and in a second step the modification reaction.

In the one step process the starting materials are polycondensed and reacted simultaneously. Preferably, the one-step procedure is applied because the viscosity is lower in the overall process and hence the processability of the product is improved.

A modified polymer can for example be represented by one of the formulas (III), (IV) or (V) in which

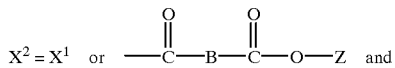

in which—O—Z is derived from a monomeric, oligomeric or polymeric alcohol.

Suitable expoxides are, for example, saturated aliphatic $(C_1-C_{26})$ epoxides and esters or ethers derived from glycidol.

Examples of suitable aliphatic epoxides are ethylene oxide, propylene oxide, 1,2-epoxy butane, 1,2-epoxy octane, 1,2-epoxydodecane, 1,2-epoxy cyclohexane and 4-vinyl-1,2 epoxy cyclohexane.

Examples of suitable glycidic esters and ethers are allylglycidylether, benzyl glycidylether, glycidyl acrylate, glycidyl methacrylate and glycidyl versatate (Cardura E™, Shell Chemicals).

Suitable oxazolines are, for example, saturated or unsaturated aliphatic ($C_3$–$C_{29}$) oxazolines derived from ($C_1$–$C_{26}$) aliphatic or ($C_7$–$C_{20}$) aromatic carboxylic acids, and ethanolamine or isopropanolamine, such as 2-(m) ethyloxazolidine, fatty acid (soy bean, tall, palmitic sunflower) oxazolidines, 2-phenyloxazoline and 2-vinyloxazolidine.

Suitable alcohols are, for example, linear or banched ($C_1$–$C_{26}$) (cyclo)aliphatic alcohols.

Examples of suitable linear aliphatic alcohols include (m)ethanol, butanol, (do)decanol, octanol and fatty acid alcohols, 2-ethylhexanol, 2,5,7-octatrienol and 1-vinylhexa-3,5-dienol.

Examples of suitable strained ring olephinic group containing compounds are dicyclopenta-diene (DCPD), dimethylcyclopentadiene, norbornene and pinene. Preferably DCPD is used.

Examples of suitable cycloaliphatic alcohols include cyclohexanol, DCPD-alcohol and cholesterol.

Z can be selected from, for example, a saturated or unsaturated ($C_1$–$C_{40}$)alkyl or aromatic group, a polymer or an oligomer. Examples of suitable polymers are polyesters, polyethers and poly(capro)lactones.

Z can be substituted with for example ester groups, ether groups, amide groups and alcohol groups.

The modified polymer may consist of the same or different Z groups.

The (modified) polymers according to the invention may be very widely used in technically different fields, both in thermosetting and in thermoplastic applications. Examples are powder paint compositions, coating systems based on water or solvent, can- or coil-coating systems, radiation-curable coating compositions, alkyd resins for coatings, unsaturated resins for construction purposes (for example putties, sealants, castings, compounds and molding compounds), inks, toner compositions, film formers for glass fibre sizings, adhesives, hot melts and in rubber compositions.

Unmodified or partly modified polymers according to the invention can generally be used in powder paint systems, in can- or coil-coating systems and in solvent-based coating systems.

If the modification has been realized with the aid of for example fatty acid alcohols, the polymer obtained can be used as an airdrying system.

A modification with radically curable compounds offers possibilities in the technical fields of radiation-curable coatings and construction resins. A modification of the polymer according to the invention with glycidyl methacrylate and/or dicyclopentadiene results in a suitable product to be applied in radiation curable coatings.

Considering the many possibilities of modification of the polymer according to the invention, modification can be directed at any of a wide range of technical applications.

According to a preferred embodiment of the invention the polymers according to the invention are applied in thermosetting powder paint compositions and in toner compositions.

Thermosetting powder paints have a better resistance to chemicals than thermoplastic powder paints. As a result of this, intensive efforts have for a long time been made to develop crosslinkers and polymers for thermosetting powder coatings. Attempts are still being made to find binder compositions for thermosetting powder paints with a good flow behaviour, good storage stability and a good reactivity. A thermosetting powder-paint binder composition generally contains more than 50 wt. % polymer and less than 50 wt. % crosslinker.

The polymer according to the invention can be used in a powder-paint composition as a polymer and as a crosslinker.

The glass transition temperature (Tg) of the polymer according to the invention lies between 0° C. and 150° C., preferably between 50° C. and 110° C., depending on the selected starting materials and the molecular weight.

Preferably a compound according to any one of formulas (I), (II), (III), (IV) or (V) is used in powder-paint compositions. It is also possible to use a polymer in which up to for example 50 wt. %, preferably less than 30 wt. %, of the acid groups are modified.

A coating that is ultimately obtained with a powder paint must meet many varying requirements. Various systems are known. Some systems release volatile components during the curing. These systems present the drawback that they form coatings with bubbles and/or that undesirable emissions are released. As far as the latter is concerned, the volatile component, if organic in origin, may cause undesirable environmental or health problems. It has moreover been found that all the desired properties of the powder paint or powder coating are not always realized.

In other systems use is made of polyesters and the usual crosslinkers containing an epoxy group, for example a bisphenol-A-epoxy resin. No volatile components are generally released from these systems.

It has been found that use of the polymer according to the invention in binder compositions in combination with bisphenol-A-epoxy-resin for powder paints results in a combination of highly desirable properties such as for instance good resistance to chemicals, desired gloss or matt appearance without bubble formation at the surface up to and including layer thicknesses of at least 120 μm, a high resistance to boiling water and salt spray, a high resistance to scratching, good mechanical properties, good powder stability and good colour stability of the powder coating.

It is surprising that use of the highly functional crosslinkers according to the invention results in a good cure behaviour in combination with epoxide group containing polymers without use of trimellitic acid(anhydride) as one of the raw materials. Generally a polyester having carboxyl endgroups has a reduced reactivity towards epoxy groups in the absence of trimellitic acid(anhydride) as one of the raw materials.

The preparation of thermosetting powder coatings in general and the chemical reactions for curing powder paints to form cured coatings are described by Misev in Powder Coatings, Chemistry and Technology (1991, John Wiley) on pp. 42–54, pp. 148 and 224–226. A thermosetting binder composition is generally defined as the resinous part of the powder paint consisting of polymer and crosslinker.

If so desired, the usual additives can be used in the binder composition and in the powder-paint system according to the invention, such as for example pigments, fillers, degassing agents, flow agents and stabilizers. Suitable pigments are for example inorganic pigments, such as for example titanium dioxide, zinc sulphide, iron oxide and chromium oxide, and also organic pigments such as for example azo compounds. Suitable fillers are for example metal oxides, silicates, carbonates and sulphates.

Primary and/or secondary antioxidants, UV stabilizers such as quinones, (sterically hindered) phenolic compounds, phosphonites, phosphites, thioethers and HALS compounds (hindered amine light stabilizers) can for example be used as stabilizers.

Examples of degassing agents are benzoin and cyclohexane dimethanol bisbenzoate. The flow agents include for example polyalkylacrylates, fluorohydrocarbons and silicone fluids. Other suitable additives are for example additives for improving tribocharging, such as sterically hindered tertiary amines that are described in EP-B-371528.

Powder paints according to the invention can be applied in the usual manner, for example by electrostatically spraying the powder onto an earthed substrate and curing the coating by exposing it to heat at a suitable temperature for a sufficient length of time. The applied powder can for example be heated in a gas oven, an electric oven or with the aid of infrared radiation.

Thermosetting coatings of powder-paint (coating) compositions intended for industrial applications are described further in a general sense in Powder Coatings, Chemistry and Technology, Misev, pages 141–173 (1991).

Compositions according to the present invention can be used in powder paints for use on, for example, metal, wooden and plastic substrates. Examples are industrial coatings, coatings for machines and tools, household applications and parts of buildings. The coatings are also suitable for use in the automotive industry for coating parts and accessories.

The invention will be elucidated with reference to the following non-limiting examples.

EXAMPLE I

Preparation of a Condensation Polymer 115 g of molten diisopropanolamine (40° C.) were added to a double-walled glass reactor, which could be heated by means of thermal oil, fitted with a mechanical stirrer, a distillation head and nitrogen and vacuum connections. Next 439 g of hexahydrophthalic anhydride (70° C.) were added. The reaction mixture was heated 180° C. After three hours at this temperature the pressure in the reactor was lowered to 2,5 mPA. After a reaction time of 2 hours, the polymer was cooled and obtained as a glassy mass. The acid value was 222 mg KOH/g resin.

EXAMPLE II

A Powder-paint Composition Comprising a Polymer According to Example I

A powder-paint composition according to Table 1 was prepared by mixing and extrusion (PRISM extruder, 120° C.). The composition was in the usual manner ground, sieved and electrostatically sprayed (Corona) onto aluminium and steel test panels. After a cure cycle of 10 minutes at 200° C. in a circulation oven.

TABLE 1

COMPOSITION AND COATING PROPERTIES

| Composition: | |
|---|---|
| Araldite GT 7004 ™ [1] | 147.34 g |
| Crosslinker according to Example I | 52.66 g |
| Additives: | |
| TiO$_2$ 2160 | 100 g |
| Benzoin | 3.0 g |
| Resiflow PV5 ™ | 1.5 g |
| Cure cycle | 10' 200° C. |
| ESP [2] | >8 mm |
| Gel time [3] | 159 sec |

TABLE 1-continued

COMPOSITION AND COATING PROPERTIES

| Acetone resistance [4] | 100x |
|---|---|
| Tg | 55° C. |
| Dr. Lange Colour b* [5] | 0.4 |

[1] epoxy resin based on bisphenol A-diglycidylether (Ciba)
[2] Erichsen Slow Penetration; ISO 1520/DIN 53156
[3] DIN 55990:part B
[4] Acetone double rubs
[5] in the overbake test the test plate is heated at 200° C. for one hour and the yellowing (b) is measured.

The polymer according to the invention results in a coating having good chemical, mechanical and optical properties and also a high blister limit (visually).

What is claimed is:

1. A polyesteramide polymer obtained by polycondensation of an alkanolamine and a cyclic anhydride having at least two carboxylic end groups connected to an alkylamide group via an ester linkage.

2. A condensation polymer according to claim 1, wherein the polymer contains at least two groups according to formula (I):

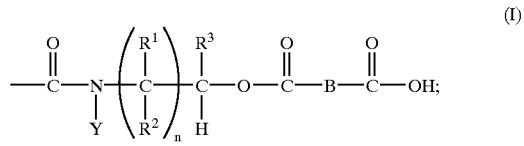

wherein

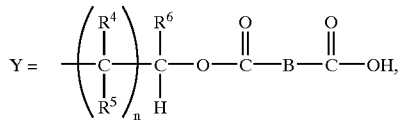

H, C(C$_1$–C$_{20}$)(cyclo)alkyl, or (C$_6$–C$_{10}$)aryl;
B=(C$_2$–C$_{24}$), optionally substituted, aryl or (cyclo)alkyl aliphatic diradical;
R$^1$, R$^2$, R$^3$, R$^4$, R$^5$ and R$^6$ each is, independently of one another, the same or different, H,(C$_6$–C$_{10}$)aryl or (C$_1$–C$_8$)(cyclo)alkyl radical; and
n=1–4.

3. A condensation polymer according to claim 1, wherein the polymer comprises at least two groups according to formula (II):

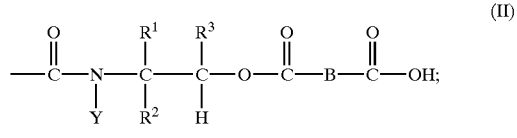

wherein

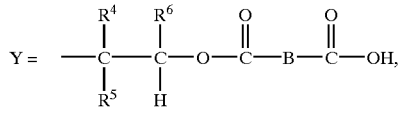

H, (C$_1$–C$_{20}$)(cyclo)alkyl, or (C$_6$–C$_{10}$)aryl;
B=(C$_2$–C$_{24}$), optionally substituted, aryl or (cyclo)alkyl aliphatic diradical;

$R^1$, $R^2$, $R^3$, $R^4$, $R^5$ and $R^6$ each is, independently of one another, the same or different, H, $(C_6-C_{10})$aryl or $(C_1-C_8)$(cyclo)alkyl radical.

4. A condensation polymer according to claim 1, wherein the polymer is a polymer according to formula (III):

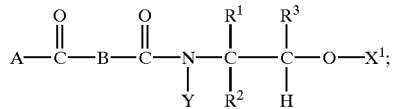
(III)

wherein

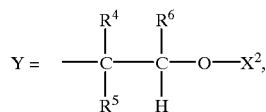

H, $(C_1-C_{20})$(cyclo)alkyl, or $(C_6-C_{10})$aryl;

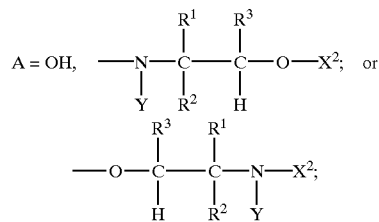

$B=(C_2-C_{24})$, optionally substituted, aryl or (cyclo)alkyl aliphatic diradical;

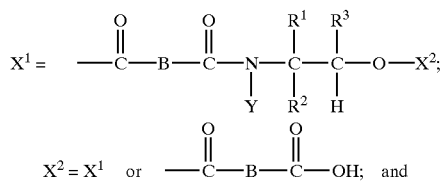

$R^1$, $R^2$, $R^3$, $R^4$, $R^5$ and $R^6$ are, independently of one another, the same or different, H, $(C_6-C_{10})$aryl or $(C_1-C_8)$(cyclo)alkyl radical or $CH_2-OX^2$.

5. A modified polymer obtained by reacting a polymer according to claim 4 with a monomer, oligomer or a polymer containing reactive groups that can react with carboxylic acid groups.

6. A condensation polymer according claim 1, wherein the polymer is a polymer according to formula (IV):

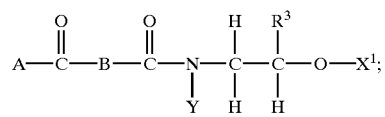
(IV)

wherein

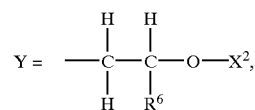

H, $(C_1-C_{20})$(cyclo)alkyl, or $(C_6-C_{10})$aryl;

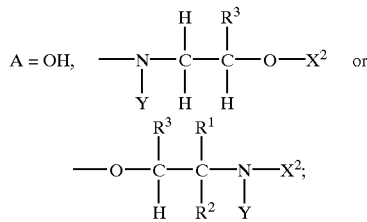

$B=(C_2-C_{24})$, optionally substituted, aryl or (cyclo)alkyl aliphatic diradical;

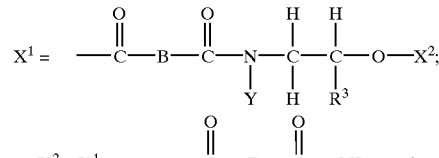

$R^3$ is H, $(C_6-C_{10})$aryl or $(C_1-C_8)$alkyl radical; and
$R^6$ is H, $(C_6-C_{10})$aryl or $(C_1-C_8)$alkyl radical.

7. A modified polymer obtained by reacting a polymer according to claim 6 with a monomer, oligomer or a polymer containing reactive groups that can react with carboxylic acid groups.

8. A condensation polymer according to claim 1, wherein the polymer is a polymer according to formula (V):

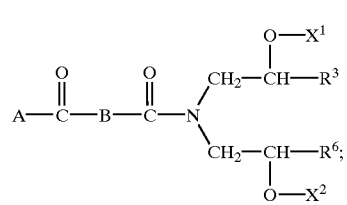
(V)

wherein

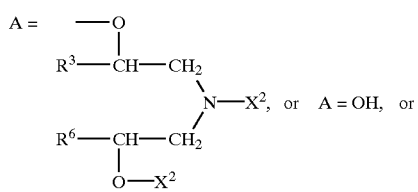

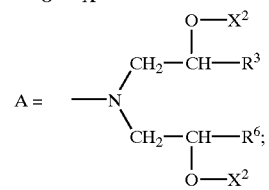

$B=(C_2-C_{12})$, optionally substituted, aryl or (cyclo)alkyl aliphatic diradical;

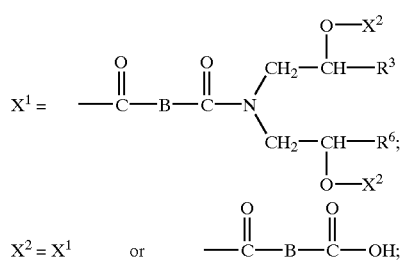

$X^2 = X^1$ or $R^3$ is H, $(C_6-C_{10})$aryl or $(C_1-C_8)$(cyclo)alkyl radical; and
$R^6$ is H, $(C_6-C_{10})$aryl or $(C_1-C_8)$(cyclo)alkyl radical.

9. A modified polymer obtained by reacting a polymer according to claim 8 with a monomer, oligomer or a polymer containing reactive groups that can react with carboxylic acid groups.

10. A process for the preparation of a polymer according to claim 1, comprising reacting an alkanolamine and a cyclic anhydride, thereby forming a hydroxylamide acid; and subsequently polycondensing the hydroxyalkylamide acid.

11. A process according to claim 10, wherein the alkanolamine is diisopropanolamine, diisobutanolamine or mixtures thereof.

12. A coating composition comprising a polymer according to claim 1.

13. A powder binder composition containing a polymer according to claim 1.

14. A powder paint composition comprising a binder composition according to claim 13.

15. A powder coating obtained by curing of a powder paint according to claim 14.

16. A coated substrate at least partly coated with the powder coating according to claim 15.

* * * * *